Feb. 26, 1924.                                                                      1,485,252
L. L. B. DENIS
FLUID TIGHT JOINT FOR PIPES FOR FLUIDS UNDER PRESSURE
Filed Oct. 15, 1920                 2 Sheets-Sheet 1

INVENTOR
LUC LÉON BASILE DENIS
BY Munn & Co
ATTORNEYS

Feb. 26, 1924.  1,485,252
L. L. B. DENIS
FLUID TIGHT JOINT FOR PIPES FOR FLUIDS UNDER PRESSURE
Filed Oct. 15, 1920   2 Sheets-Sheet 2
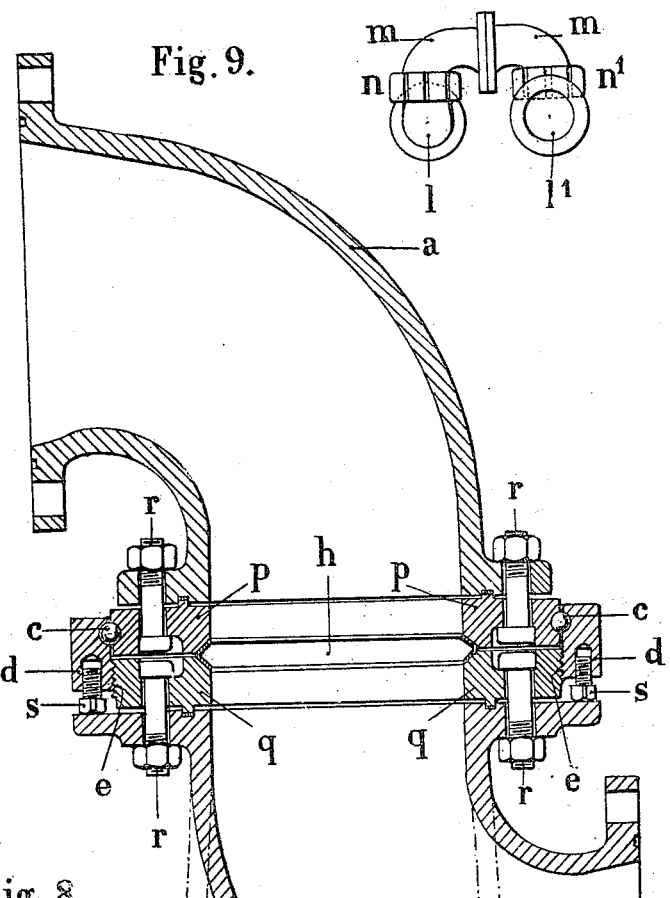
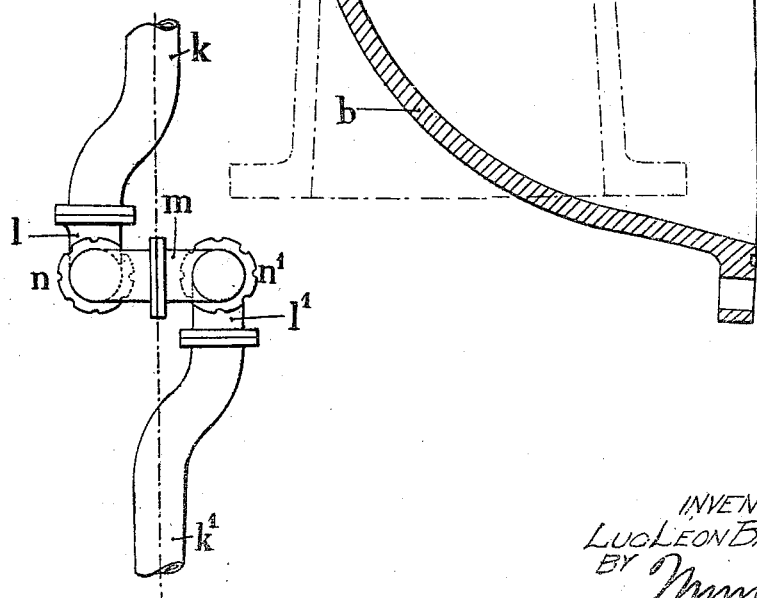

Patented Feb. 26, 1924.

1,485,252

UNITED STATES PATENT OFFICE.

LUC LÉON BASILE DENIS, OF PARIS, FRANCE.

FLUID-TIGHT JOINT FOR PIPES FOR FLUIDS UNDER PRESSURE.

Application filed October 15, 1920. Serial No. 417,259.

*To all whom it may concern:*

Be it known that I, LUC LÉON BASILE DENIS, of 116 Boulevard de Ménilmontant, Paris, France, have invented an Improved Fluid-Tight Joint for Pipes for Fluids Under Pressure, of which the following is a full, clear, and exact description.

It is known that, in the pipes through which a fluid under pressure passes, such as water, compressed air, etc., it is necessary to provide, at certain points in these pipes, joints serving to permit the expansion due to increase of temperature, or to permit any movements rendered necessary from any other cause.

A joint of this kind has two functions to fulfill:—

(1) A mechanical function consisting in ensuring the connection of the elements between which it is placed, whilst permitting the easy relative movement of the elements connected.

(2) A function of producing fluid tightness consisting in preventing any escape of fluid under pressure in all the positions assumed by the elements united by the said joint.

In the forms of joints heretofore known, the two functions above mentioned are generally performed by the same part; as a rule the part effecting the mechanical connection is adjusted with sufficient precision to render it fluid tight, or recourse is had to stuffing boxes or similar arrangements. In any case, the forces tending to move the joints are applied on the devices which have to ensure fluid tightness, thus producing either an excessive friction, or a leakage.

In the device forming the subject of my invention, the two functions defined above are clearly separated, each being fulfilled by a distinct part in such a manner that the part having the mechanical function alone supports the forces due to the bending or swivelling movements, whilst the part producing fluid tightness only follows the movement of the first part, thus ensuring fluid tight operation in all positions of the joint.

The part for effecting the mechanical connection consists essentially in a ball bearing arranged concentrically to the axis of the joint. The movements take place on the ball bearing so that the joint can be subjected to considerable forces which only produce a slight amount of friction.

The part for producing fluid tightness is formed by a ring, preferably elastic, having spherical seats, arranged between the two elements of the joint which move relatively to each other and which terminate in seats that are likewise spherical, on which the said ring bears.

The invention is illustrated, by way of example only, in the accompanying drawing, wherein:—

Figures 4, 5:
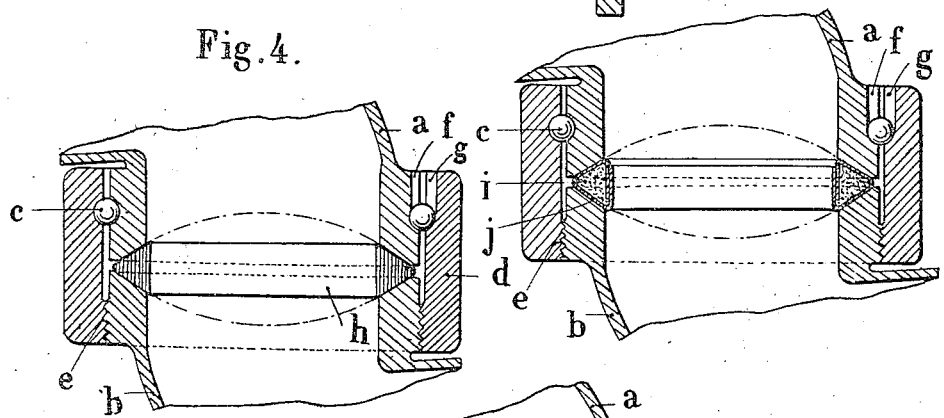
Figure 6:
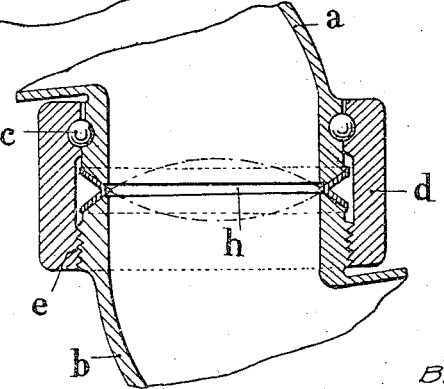

Figures 4, 5 and 6 relate to modifications.

Figure 7 shows in elevation, and

Figure 8 in corresponding plan one application of the invention.

Figure 9 shows a form of execution in which the joint is independent from the elements to be connected.

As shown in the drawing, the two end sections $a$, $b$ of the lengths of piping which are to be jointed together, are united by means of a ball bearing $c$, the balls of which are arranged on the one hand in a semicircular groove in one of the end sections and on the other hand in another semicircular groove formed in a ring $d$ connected to the other end section $b$ in any suitable manner, for example screwed by means of a thread $e$.

Any suitable known device (not shown) prevents unscrewing.

The balls can be introduced into their seats by means of a recess $f$ formed in the end section $a$ and another recess $g$ formed in the ring $d$. When these notches are brought opposite to each other the balls can be introduced and passed one by one into their grooves or races.

After the introduction of the balls, the elements of the joint are turned in order to bring them into the position in which they are to operate, wherein the notches are no longer opposite to each other, so that the balls cannot escape.

Under these conditions, the joint section $a$ and the joint section $b$ can turn relatively to each other, the balls rolling in their races. A swivel joint is thus obtained having a minimum of friction. On the other hand if the ball bearings are suitably tightened up, the two end sections are firmly connected together and are capable of resisting considerable forces. Finally this arrangement enables all lubrication to be dispensed with, this condition being necessary with pipes for superheated steam for which the new device is more especially designed. The part for producing fluid tightness is formed by a ring $h$ of special form which is clearly shown in the drawing. It is formed by two spherical segments connected together and it rests on seats which are also spherical formed in the ends of the joint sections $a$ and $b$.

When once the parts are in place, the spherical surfaces of this ring are placed against the corresponding seats in the end sections and form a tight joint. When the two sections $a$ and $b$ turn relatively to each other about the axis of the ball bearings on which axis there lie theoretically the centres of these spherical surfaces, it is clear that fluid tightness will exist.

Figure 2:
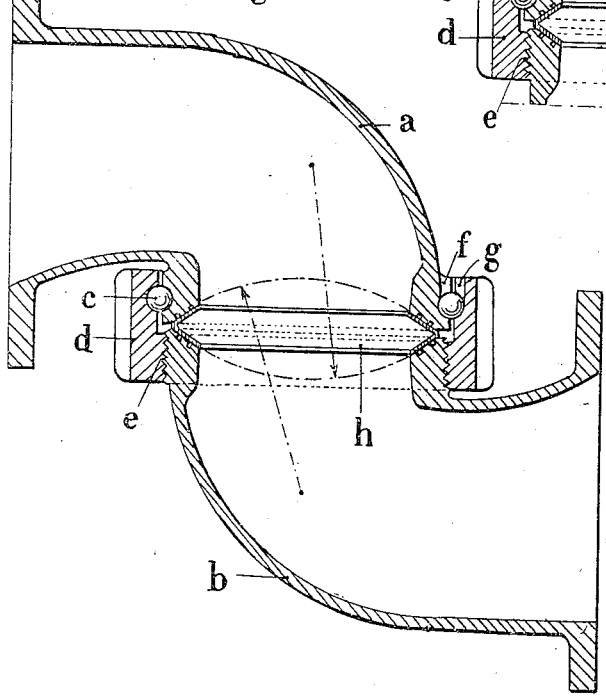
Figure 2 is a longitudinal section of the whole joint.

Figure 2 shows the above joint as used for connecting the two elbows $a$ and $b$.

It should be noted that the internal pressure tends to open the ring by pressing each of its spherical zones against the corresponding seat in such a manner that the fluid tightness tends to increase as the pressure becomes greater in the interior of the conduit.

The new device has many other advantages.

It is easy in practice to produce exact and correct spherical surfaces, and by grinding one can easily render the parts in contact perfectly fluid tight.

Moreover the combination of two opposite spherical seats, between which there is placed a ring of corresponding form, has the advantage of correcting automatically or at least of rendering harmless any imperfections of alignment of the seats and the ball races.

Figure 3:
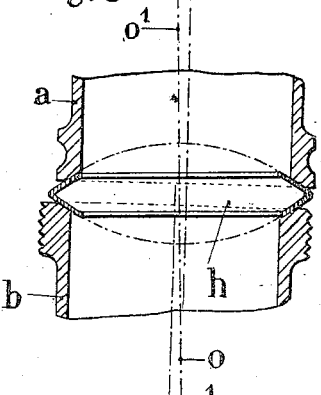
Figure 3 is a detail view for enabling the operation of the new device to be understood.

Suppose, as shown in Figure 3, that the axes of the sections $a$ and $b$ do not coincide exactly. The spherical seats of the sections are displaced laterally relatively to each other, and the centres $o$ and $o'$ of the generating spheres of these surfaces are on a line which is oblique relatively to the axis $y\ y'$ of the ball bearings. Moreover a slight inclination of the ring $h$ enables it to take a position such that the centres of its spherical seats shall be exactly at $o$ and $o'$ in such a manner that there will be fluid tightness notwithstanding the imperfect centering of the sections.

Fluid tightness will also be maintained during the rotary motion of $a$ relatively to $b$ provided that the obliquity of $o, o'$ relatively to $y, y'$ is not too great.

It will be understood that if, by means of the screw thread $e$, a certain degree of tightness is produced between the sections $a$ and $b$ and the ring $h$, the spherical surfaces of this ring will bear elastically against the corresponding seats and will produce fluid tightness which is maintained during the relative movements of the sections $a$ and $b$ and notwithstanding slight defects in the centering of these parts.

Another advantage is the facility of repair which can be effected in place in most cases. The surfaces on which the fluid tight joint is made can be easily brought into condition by grinding.

The ring $h$ is capable of being made in various constructional forms.

Figure 1:
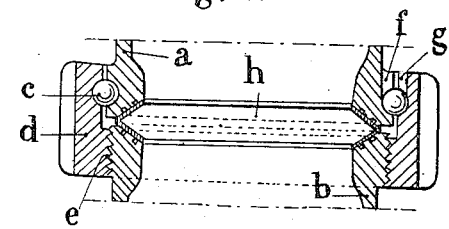
Figure 1 is a view showing the principle of the invention.

In the arrangements shown in Figure 1, the ring is channelled so as to give it elasticity. This method of construction is not obligatory. The ring $h$ may be solid as shown in Figure 4, its profile will then be an isosceles triangle with curved sides.

The ring may be formed by a core of plastic material $i$ surrounded by a casing of thin copper $j$, Figure 5, the whole forming a joint of the type known as metalloplastic.

Instead of convex spherical surfaces, as shown in Figures 1, 3 and 4, the ring may have concave spherical surfaces as shown in Figure 6. The ring in this case may be channelled as shown in Figure 6 or it may be solid in a manner similar to the arrangement shown in Figure 4.

Figures 7 and 8 show the application of the invention to an arrangement for permitting the expansion of a length of steam pipe.

The two sections of pipe $k$ and $k'$ are bent out of line to a convenient extent and each bears a bent joint section $l$ and $l'$ respectively. These two joint sections are connected by a U-shaped arm $m$, formed for example by two bends similar to those just mentioned, these arms being connected to the joint sections $l, l'$ by two joints $n, n'$ made as hereinabove described.

By reason of this arrangement the two portions $k, k'$ of the pipe can move longitudinally relatively to each other according to variations of temperature.

In the foregoing description, it has been supposed that certain elements of the joint were integral with the members to be connected.

Fig. 9 shows another form of construction, in which: the constituent parts of the joint are independent from these members, which gives very important advantages, as will be indicated hereafter.

In this case, the joint adapted to connect two elbows $a$ and $b$, or starting points of pipes, comprises two plates $p$ and $q$ secured by means of bolts $r$ on the flanges of the elbows $a$ and $b$, each of these plates being provided with a spherical seat on which rests the ring $h$ having spherical seats corresponding to the previous seats; these plates are connected by a ring $d$ screwed on one of the plates, viz, $q$, and provided with a semicircular groove opposite a similar groove of the plate $p$, in which is located a crown of balls $c$.

An auxiliary device is adapted to prevent the unscrewing of the ring $d$; this device may consist, as illustrated, in screws $n$ the head of which rests on the flange of the elbows $b$ when they are rotated so as to cause them to move out from their recesses.

As will be easily understood from the foregoing, the joint is constituted by four special members, viz: the two plates $p$ $q$ and the rings $h$ $d$ and the whole of these elements is independent from the parts which are to be connected by the joint. The unions or elbows necessary for connecting the joint to the piping are secured on the joint.

The main advantages of the arrangement shown in Fig. 9 are as follows:

1.—The joint proper composed of the four members or parts $p, q, h, d$ can be manufactured beforehand in series and in a limited number of types, notwithstanding the very different diameters presented by the various pipes capable of being used. In fact, it is possible, without inconvenience, to give to the elbows $a$ and $b$ a slight conicity so as to take up the differences of diameters between the chosen piping and joint the diameter of which most nearly approximates that of the piping. These parts $a$ and $b$ are castings easy to be obtained, which are made afterwards according to the requirements and which necessitate only a rudimental machining work.

2.—Considering the simple shape of the plates $p$ and $q$, the latter can be easily mounted in the lathe and are capable of being made with great precision. They can be made of forged or stamped metal and consequently of a more regular quality than in cast material without presenting the blisters and other defects of the latter.

3.—The ball bearing and screw thread may have an appreciably greater diameter than that of the steam passage, thus enabling them to resist in a better manner the lateral strains. The increase in diameter of the crown of balls allows the use of smaller balls, which is an advantage.

Claims:

1. In a tight articulation for fluids under strong pressure and high temperature, a pair of pipe elements having spherical seats on their opposing ends, a joint ring screwed on one of the pipe elements, a ball bearing connecting said joint ring to the other pipe element, and a flexible metal tightening ring having spherical bearing faces engaging said spherical seats.

2. A joint for pipes comprising in combination two abutting pipe sections, a flangeless internally threaded ring adjustably secured on one section and extending over the end of the other section, the last named section and the overhanging portion of the threaded ring having complementary annular grooves forming a ball race, balls in said race and forming a connection between the threaded ring and the section which it overlaps, whereby the sections may rotate relatively about their longitudinal axis, and may also move transversely with respect to their longitudinal axis, the abutting ends of said sections channeled out to form seats with a spherical surface, and a resilient metal ring adapted to be forced to said seats by pressure of the fluid in the pipe, said ring having its periphery formed of convergent spherical surfaces adapted to mate with spherical surfaces of the pipe sections.

3. In a joint for steam pipes under pressure, in combination a pair of abutting pipe sections to be connected, annular plates rigidly secured to the abutting ends of the sections, a ball bearing connection between said plates and allowing their relative rotation, the abutting faces of said plates having spherical surfaced grooves at their inner edges defining spherical ring seats, and a resilient metal ring for producing a fluid tight joint, said ring provided with similar spherical surfaces adapted to cooperate with the spherical seats of the said plates.

The foregoing specification of my "improved fluid tight joint for pipes for fluids under pressure" signed by me this 24 day of Sept., 1920.

LUC LÉON BASILE DENIS.